United States Patent Office 2,865,519
Patented Dec. 23, 1958

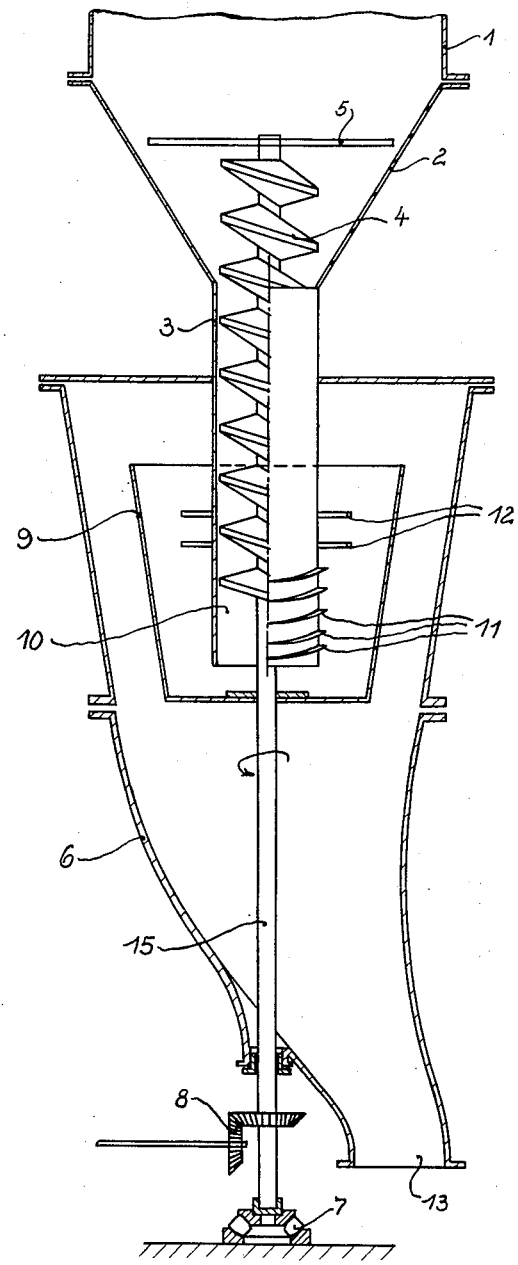

2,865,519

APPARATUS FOR TRANSFERRING PULVERULENT MATERIAL BETWEEN CHAMBERS OF DIFFERENT PRESSURES

Rudolf Wessollek, Gelsenkirchen, Germany, assignor, by mesne assignments, to Koppers Company, Inc., Pittsburgh, Pa., a corporation of Delaware Application February 10, 1953, Serial No. 336,181

Claims priority, application Germany February 14, 1952

3 Claims. (Cl. 214—17)

This invention relates to a process for the continuous transference of finely granular material, particularly pulverulent material from one chamber into another which is at a pressure different from the pressure in the first chamber. The invention also relates to an apparatus for carrying out this process.

In technology there frequently arises the problem of transferring finely granular pulverulent material from one chamber subjected to a certain pressure, into another chamber in which there exists a higher or lower pressure. When, for example, a fuel gas is produced by the gasification of pulverulent coal, there occurs in the dust separator (cyclone) connected after the gasification chamber, a similarly pulverulent residue consisting of ash and ungasified carbon. If this residue is to be removed continuously from the dust separator a difficulty arises if there exists in the gas producer a pressure different from atmospheric pressure, particularly a higher pressure than atmospheric pressure. The useful gas produced likewise endeavours to pass into the open through the withdrawal device for the pulverulent material, which, apart from the interruptions in operation is also attended with the loss of valuable gas.

The same problem exists if, for example, pulverulent fuel is to be introduced into a gasification chamber in which gasification takes place at increased pressure. In this case also the continuous supply of the fuel dust presents considerable difficulties on account of the tendency of the gas existing in the reaction chamber at increased pressure, to escape through the dust supply devices, and these difficulties are also complicated compared to the aforesaid case, by the fact that the oxygen required for the gasification reaction can in some circumstances react with the fuel supply in the fuel bunker to cause coal dust explosions.

Suggestions have been made for transferring pulverulent material from one chamber into another chamber which is at a pressure different from the pressure in the first chamber, by means of a device constructed in the manner of a sluice. These sluice-like devices certainly fulfill their purpose but they are comparatively complicated in construction and in use and do not make possible a continuous transport of the pulverulent material.

Also, for comparatively high pressure differences between both chambers, continuous or quasi-continuous transfer devices have been proposed. For comparatively small pressure differences, e. g., 500 mm. WS, these devices involve an expenditure which is no longer possible.

The invention aims at effecting the continuous transfer of a finely granular or pulverulent material, between two chambers at different pressures, by comparatively simple means and with the avoidance of additional expenditure for operating personnel.

The method according to the invention consists in that the finely granular or pulverulent material is first of all delivered through a vertical pipe secured fast with the first chamber and by means of a worm rotatably mounted in this pipe, fed downwardly into a dish which surrounds the lower part of the pipe forming a concentric annular intermediate space therewith and which is rigidly connected with the driving shaft for the worm, whereafter the material, on account of the advancement through the worm against gravity is moved upwardly and over the edge of the dish into a discharge hopper, connected with the second chamber.

According to the invention, the worm as arranged in the vertical pipe is only provided at its upper shaft part with screw threads whilst at the bottom end dipping into the dish it is left, at least partly free from screw threads. By means of this feature there forms in the lower part of the vertical pipe connected with the first chamber, a column of the material to be delivered which by the advancement effected by the rotating worm is moved on downwardly as a closed column in the vertical pipe whereafter it passes into the annular intermediate space between the fixed vertical pipe and the rotating dish. This intermediate space fills completely with the material to be delivered. The quantity of material in the unthreaded part of the worm, which, as stated above is only advanced downwardly as a whole in the direction of the axis of the worm, forms so to speak a submersion which is similar to the known liquid submersion. The extent of the checking action of this quantity of material in the lower part of the vertical pipe connected with the first chamber can be adapted to the pressure difference between the two chambers which has to be overcome, by a corresponding selection of the size of the unthreaded part of the worm.

As already indicated, the material in the annular intermediate space between the fixed vertical pipe and the rotary dish is delivered upwardly against gravity on account of the thrust by the worm. In order to facilitate the avoidance of pressure seepage along the outer surface of the vertical pipe during the upward conveyance of this material, guide blades are provided on the outer wall of the vertical pipe. In order in all circumstances to prevent a connected path for a possible escape of gas from forming on the outer surface of the vertical pipe, there are further provided on the outer wall of the pipe, in the region of the dish above the blade-shaped extensions, one or more radially directed plates which extend to a considerable extent into the annular intermediate space and in this way suppress the formation of a gas flow along the outer wall of the pipe.

In the drawing there is shown partly in vertical section and partly in elevation an apparatus suitable for carrying out the process according to the invention.

The device shown may be used to withdraw from a cyclone, which is at a certain increased pressure, for example 300 mm. WS, the separated pulverulent residue of the gasification of pulverulent fuels. The dust in the cyclone 1 collects in the hopper shaped part 2 of the cyclone. Connected to this part is the vertical pipe 3 in which is rotatably mounted a worm 4. The end of the worm 4 projecting into the cyclone is provided with a stirring arm 5 which prevents a caking together of the accumulating dust. The worm 4 is driven by means of a shaft 15 which extends with a dust-tight fit through a discharge hopper 6 surrounding the extracting device and is mounted in a bearing 7. The worm is driven, through a driving device not shown, by means of the bevel gear 8.

Fixed to the driving shaft 15 of the worm 4 there is a dish 9 which rotates with the worm within the discharge trough 6 which is connected to the second chamber—not shown—under atmospheric pressure. In this dish 9 the fixed pipe 3 extends nearly to the base of the dish a distance that is but a minor portion of the diameter of the exit end of the pipe 3, one-third, as shown. The worm 4 is not formed with threads over its whole length within the pipe 3 but has in the lower region of the pipe 3 an unthreaded part 10. Thus, whilst in the upper part of the worm the conveyance of the dust takes place within the screw threads the dust leaving the worm at the bottom is advanced within the unthreaded section 10 as a closed column or plug, by means of the dust continuously carried along by the worm. On account of the permanent thrust the dust passes downwardly out from the vertical pipe 3 and now moves upwardly within the annular intermediate space between the pipe 3 and the dish wall 9, against gravity. In addition the dust itself partakes in the rotary motion of the dish and thus has a relative movement with respect to the fixed pipe wall 3, whilst its relative movement with respect to the dish wall is practically nil. If the worm stops for any reason during operation or the advancement of the dust is interrupted, then in all cases a sufficient sealing is obtained through the fact that in the lower part of the pipe 3 there is a column or plug of dust stationary with respect to the inner wall of the pipe 3, which, if the unthreaded section 10 is of sufficient dimensions, is also sufficient for sealing even when the dish is not full, or not completely full to the upper edge with dust.

The upward movement of the material of the pressed column as dust in the annular space between the pipe 3 and the dish wall 9 which, as already stated, partakes substantially in the rotary movement of the dish, is assisted by the fact that in the lower part of the pipe 3, on the outer wall thereof, there are blade-like extensions 11 which have a certain inclination in the manner of the thread of a screw but set to run reversely to the run of the worm. These blade-like extensions may extend completely around the pipe 3. It is often sufficient, however, to provide these extensions on only one part of the periphery of the pipe 3.

As the dust has a relative movement with respect to the outer wall of the vertical pipe 3 it can at least theoretically form a connected path along the outer wall of the pipe 3, through which a gas exchange could take place between the two chambers. In order to prevent this there are arranged above the guide blades 11 annular extensions 12 projecting perpendicularly to the axis of rotation of the dish, radially outwards and extending by a considerable amount into the annular intermediate space, i. e. into the dust filling of this annular intermediate space, and in this way they suppress the further formation of a continuous gas path along the outer wall of the pipe 3.

The part of the discharge device surrounding the dish is surrounded with a dust tight discharge hopper 6 which in its lower part 13 opens into the intermediate chamber, not shown.

I claim:

1. Apparatus for transferring finely divided granular material, particularly pulverulent material comprising, the combination with a chamber of a downflow pipe secured fast to said chamber and extending to another area at a different pressure from that of said chamber, an upwardly open dish concentrically surrounding the discharge end of the pipe leaving an annular intermediate overflow space therebetween, and a worm rotatably mounted in said pipe and rigidly connected to the dish for rotation of the dish therewith, said worm terminating at its discharge end at a level in advance of the discharge end of the pipe but below the level of the top of the dish leaving the discharge end of said pipe free of worm action where the pipe discharges onto the dish, whereby material from said chamber is thrust to the dish through the pipe by the worm forming a solid plug of material on the dish and extending up inside the lower end of the pipe; and thence upwardly against gravity in the annular space of the dish and over the upper edge of the dish into said another area of different pressure under the gas pressure sealing action of the solid plug of material in the discharge end of the pipe under pressure of the worm feed and the counter gravitative force of the contiguous higher column of said material flowing against gravity to the upper edge of the dish.

2. Apparatus as claimed in claim 1, and in which the discharge end of the pipe is provided with material feed blades on its outer surface at a level below the level of the upper discharge edge of the dish, said blades being disposed in planes at an angle to the axis of rotation of the dish to maintain the upfeed of material in the dish during rotation thereof.

3. Apparatus as claimed in claim 2, and which includes at least one radially directed sheet fast on the outer surface of the downflow pipe below the top of the dish but above the discharge end of the pipe, said sheet being disposed perpendicularly to the axis of rotation of the dish to suppress the formation of gas flow leakage from one to the other of said chamber and said another area along the outer side of said downflow pipe.

References Cited in the file of this patent

UNITED STATES PATENTS

| 2,544,575 | Weber | Mar. 6, 1951 |
| 2,614,823 | Berkemeyer | Oct. 21, 1952 |

FOREIGN PATENTS

| 904,842 | France | Mar. 19, 1945 |
| 1,010,990 | France | June 17, 1952 |